Figure 1:
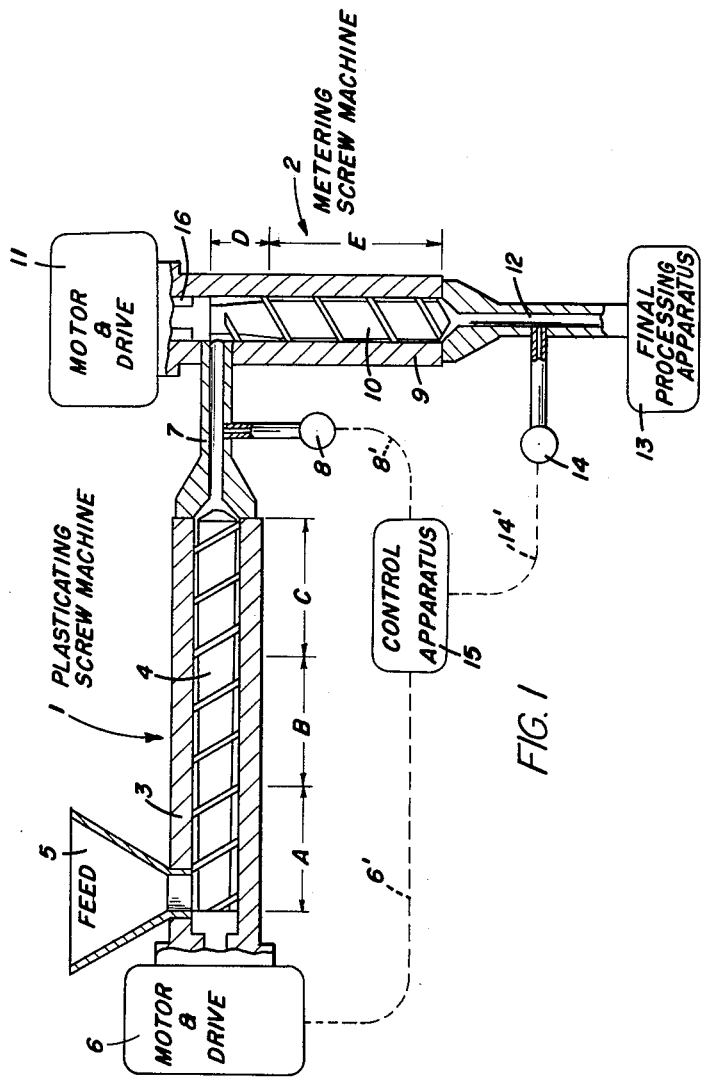

Sept. 8, 1964      A. W. SPENCER      3,148,231
PLASTIC EXTRUSTION, APPARATUS AND CONTROL
Filed March 20, 1961      2 Sheets-Sheet 1

ARTHUR WILLIAM SPENCER
INVENTOR.

BY R. Frank Smith
Charles L. Good
ATTORNEYS

Sept. 8, 1964          A. W. SPENCER          3,148,231

PLASTIC EXTRUSTION, APPARATUS AND CONTROL

Filed March 20, 1961          2 Sheets-Sheet 2

ARTHUR WILLIAM SPENCER
INVENTOR.

BY R. Frank Smith
Charles L. Good

ATTORNEYS

United States Patent Office 3,148,231
Patented Sept. 8, 1964

3,148,231
PLASTIC EXTRUSION, APPARATUS
AND CONTROL
Arthur William Spencer, Rochester, N.Y., assignor to
Eastman Kodak Company, Rochester, N.Y., a corporation of New Jersey
Filed Mar. 20, 1961, Ser. No. 97,061
13 Claims. (Cl. 264—40)

This invention relates to an improved method and apparatus for extruding plastics. More particularly, it pertains to an apparatus which minimizes the flow rate variations of the plastic while at the same time permitting attainment of substantially constant plastic stream temperature. Further, it provides improved assurance of the complete melting and physical homogeneity of the plastic stream. This invention involves two close coupled machines which are joined together under positive plastic pressure. The first machine speed responds automatically to pressures in a manner which substantially eliminates variations of the discharge flow rate from the second machine.

In the extrusion of plastics and similar materials, it is conventional to employ one extrusion machine which is designed to accept a powder or granular feed material on a screw, melt said material within a barrel with the aid of external heaters, and convey molten plastic to a screen pack, die and the like. The screw is designed to develop pressures sufficient to overcome the flow restrictions located downstream from the screw. The multi-purpose functions of a conventional screw and extrusion machine do not permit adequate regulation of the discharge rate. Variations ranging from 5–10% of the average rate are commonly encountered. Another conventional extrusion machine involves a two-stage screw wherein a deep flighted portion of the screw separates the initial melting and pumping areas from the pumping area in which the final discharge pressure is developed. Frequently, an extraction of water and/or volatiles is performed in this deep flighted section between the two screw stages. This machine type, while offering advantages, in some instances, over a single stage screw, cannot be relied upon to regulate the discharge rate, often allowing variations of 5–10%. Similarly, the plastic discharge from many conventional types of machines exhibits temperature variations which cannot be reduced below 1–10° F. Further, conventional extrusion machine types often discharge plastics which are not fully melted and are not completely homogeneous.

It is an object of this invention to provide apparatus and a process for continuously forming and advancing at a constant rate a stream of homogeneous and completely softened plastic material adapted to be formed by shaping means into an elongated shape having uniform dimensions. Another object of this invention is the provision of an extruder system which will permit attainment of discharge rates with variations less than 0.2%.

A further object is the provision of an extruder system which will permit attainment of plastic discharge temperatures constant to within 0.3° F.

Still another object of this invention is the provision of an extruder system which provides a greater assurance of complete melting and plastic stream homogeneity than can be obtained from conventional machines.

Further objects are apparent elsewhere herein.

According to a generalized embodiment of this invention there is provided a process for continuously forming and advancing at a constant rate a stream of homogeneous completely softened plastic material adapted to be formed by shaping means into an elongated shape having uniform dimensions comprising (1) plasticating said plastic material under heat and pressure regulation whereby it is formed into a homogeneous and completely softened stream, (2) transferring said stream of plastic material under pressure to a metering machine which comprises a heat-regulated cylinder containing a metering screw, (3) measuring the pre-metering pressure of said stream while being transferred to said metering machine, (4) transferring said stream to shaping means, (5) measuring the post-metering pressure of said stream while being transferred to said shaping means, and (6) regulating the pre-metering pressure and the differential pressure in relationship to said plasticating flow rate and said metering screw rate, whereby said stream being transferred to said shaping means flows at a constant rate, said differential pressure being said pre-metering pressure minus said post-metering pressure.

Figure 2:
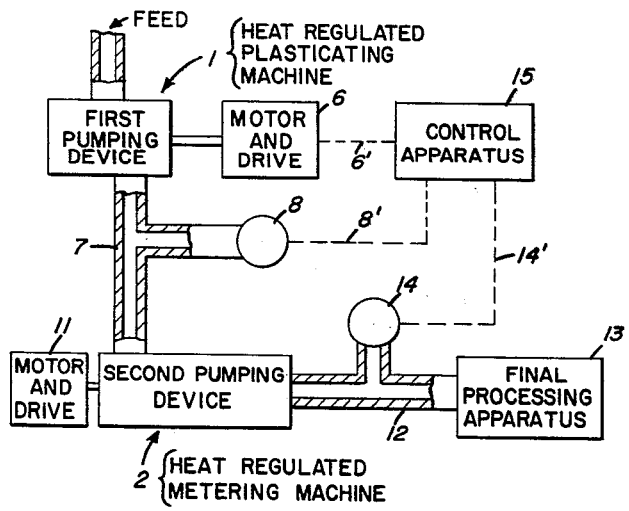
Figure 3:
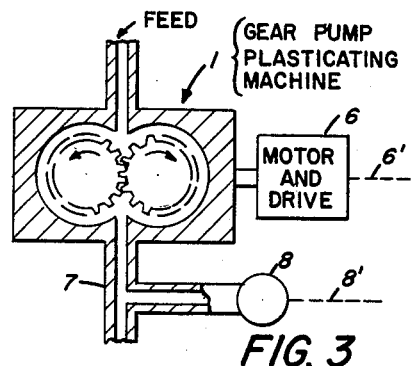
Figure 4:
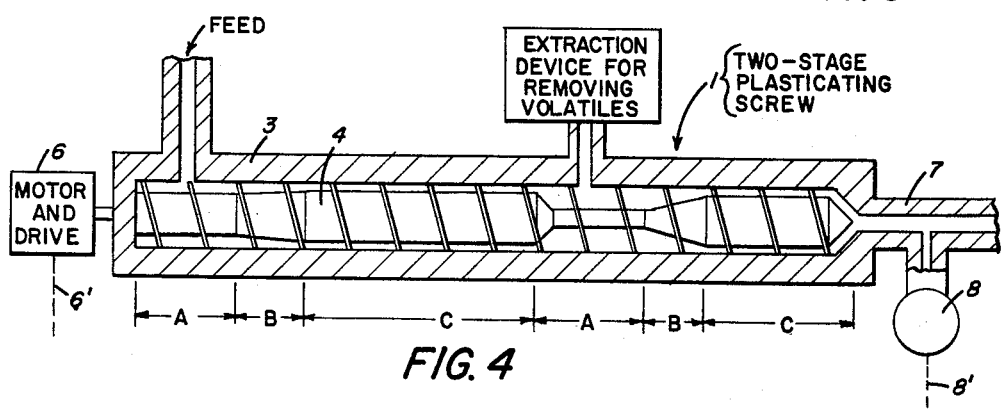

Apparatus embodying and adapted to demonstrate this invention is illustrated in the accompanying drawings wherein FIGURE 1 is a side elevation, partly in section, of a preferred form of my invention. FIGURE 2 is similar to FIGURE 1 except that the entire apparatus is shown schematically and includes reference to the fact that appropriate heat regulating equipment is provided. FIGURES 3 and 4 illustrate other specific embodiments with particular regard to the heat regulated plasticating machine, i.e., the first pumping device. FIGURE 3 illustrates the employment of a gear pump and FIGURE 4 shows that a two-stage screw machine can be used which contains a vacuum device for extraction of volatile constituents. The identification numerals in all of the drawings have similar meaning.

Referring now to the drawings, it will be noted that the invention comprises two machines: a first machine called the plasticating machine 1 and a second machine called the metering machine 2. The plasticator 1 comprises a conventional cylinder 3 and screw 4, the screw commonly consisting of feed, compression, and metering zones designated respectively as A, B and C. Zone C is not essential and could be omitted although it is advantageously present. A feed hopper 5 is provided for introduction of solid plastic material in granular, powder or similar form. A variable speed motor and gear reducer are shown collectively at 6. Appropriate heating and cooling equipment is located within or adjacent to cylinder 3 in a manner well known to the art. Although the screw commonly consists of feed, compression, and metering sections; this is not to be taken as a limitation. FIG. 4 illustrates that a two-stage screw containing extraction and pumping sections in addition to those sections described above can also be employed. FIG. 3 illustrates one among various possible other arrangements known in the art which need not be screw machines, e.g. a gear pump.

Adjacent to the last section of screw 4 shown in FIGURES 1 and 4, there is provided a pipe connection or transfer line 7 through which the molten plastic flows under positive pressure into the metering machine 2. A pressure measuring device 8 is located in the pipe line 7, the purpose of which will hereinafter become apparent. The metering machine 2 comprises a shortened extrusion cylinder 9 and a metering type screw 10. The screw comprises a short compression or stuffer zone D and a long metering zone E. A variable speed motor and gear reducer or other drive are shown collectively at 11. Appropriate heating and cooling equipment are located within or adjacent to cylinder 9 in a manner well known to the art. Adjacent to the metering zone E there is provided a pipe connection or transfer line 12 which connects to a filter, die or the like shown collectively at 13. A pressure measuring device 14 is located in the pipe connection 12, the purpose of which will hereinafter become apparent. The pipe connection 7 makes a pressure joint between the last zone of screw 4 and the first or compression zone D of screw 10. The pipe connections 7 and 12 are provided with suitable heating apparatus. A packing gland 16 seals the rear or drive end of metering screw 10. An instrument control circuit 15, shown schematically, is located between pressure elements 8 and 14, and the plasticator motor 6.

In operation and use, the granular or powdered plastic is fed to the plasticator 1 through hopper 5, the cylinders 3 and 9 and the pipe connections 7 and 12 being heated to and above the melting temperature of the plastic. As the screw 4 rotates, the plastic is conveyed forward and melted. In the case of a two-stage screw, as illustrated by FIGURE 4, an extraction of low boiling volatiles takes place after the initial melting on screw 4. The molten plastic is pumped, under positive pressure, through pipe line 7 into zone D of screw 10. When the molten plastic is introduced into cylinder 9, it is carried forward by rotating screw 10. The molten plastic is then pumped through line 12 and subsequently through area 13 where the plastic is finally processed such as by filtering, extrusion, etc. in the final processing apparatus which requires a constant feed rate but may necessitate changes in pressures from time to time.

Screw 4 is operated at speeds sufficient to create pressures in the range 50–3,000 p.s.i. at pressure measuring element 8. The speed of screw 4 is automatically regulated by a signal from element 8 operating through controller 15 to maintain a constant predetermined pressure in line 7. Screw 10 is a shallow, extremely positive metering screw, capable of developing pressures in the range of 5,000 to 10,000 p.s.i. as measured by pressure device 14. A large portion of the energy required to rotate screw 10 is converted into sensible heat within the plastic of cylinder 9. The cooling devices, located within or adjacent to cylinder 9 carry away this excess heat, thereby allowing delicate regulation of the plastic stream temperature.

The screw speed of screw 10 of metering machine 2 can be adjusted and set at a predetermined rate to obtain any desired constant flow rate. The instrument controller system 15 connecting pressure measuring element 8 to motor 6 comprises the combination of conventional control circuit components of reset, rate action and proportional band. Other control means can be used such as pneumatic controls, etc.

The flow rate issuing from metering screw 10 is substantially insensitive to all external influences, such as increased flow resistance at die and filter area 13, variation of feed pressure in line 7, variation in plastic stream temperature in line 7, variation in flow viscosity of the plastic throughout the machine area and similar external influences.

It has been found that a conventional plasticating screw cannot be designed to minimize, to the same degree, the effect of these external influences. The multiple requirements of such a screw prevent selection of the most favorable rate regulation characteristics. Further, the flow rate issuing from a conventional extrusion machine is a function of pumping action along the entire length of the screw. The feed and compression zones, as well as the metering zone contribute to the total flow rate from the machine. Although the third or metering zone of conventional machines is normally designed to minimize these contributions, the best arrangements meet with only limited success. The inherent instability associated with feeding, melting, and compression of plastic cannot be completely eliminated in such conventional macihnes.

A novel feature of the present invention is the separation of the metering action of an extrusion screw from the melting, compression and mixing functions in combination with the unique means by which two such units are combined and controlled to produce a constant rate of feed to the final processing appaartus, which feed may be under different pressures from time to time. Some previous designs of extrusion equipment have involved two screws, but not for the purpose or in the manner herein described. This invention comprises a novel combination of two extrusion machines, the first machine feeding the second machine at positive pressure without bypasses or pressure relief lines or the like. No separation of volatiles or similar materials is performed between or adjacent to pipe connection 7 but may be done at zone B or between zones B and C, if desired. Utilization of pressure measuring element 14 according to the process described almost completely eliminates the effect of external influences on the discharge flow rate of the novel dual machine system. In this latter refinement of the invention, the pressure from element 14 called $P_{14}$ is subtracted from the pressure at element 8 called $P_8$. The difference in these pressure $P_8 - P_{14} = \Delta P$ is maintained constant by the action of controller 15. The speed of screw 4 is automatically varied to maintain this constant differential pressure at any desired level in the range of minus 5,000 p.s.i. to plus 5,000 p.s.i. The differential pressure is advantageously operated at minus 100 to minus 500 p.s.i. depending on the particular rate and plastic viscosity level. This differential pressure is advantageously selected to provide assurance that screw 10 is pushed back against the thrust bearings contained in assembly 11. While the differential pressure can be operated at positive values, such operation tends to allow screw 10, in some types of design, to float back and forth producing an undesirable rate fluctuation. However, suitable design provisions can overcome this. It is the constant maintenance of this uniform pressure difference over the length of zone E which can be called $\Delta P$ which results in extremely fine flow rate regulation. It is manifest to those skilled in the art that pressure element 8 could be located at any point between the end of screw 4 and the beginning of zone E on screw 10.

The theory of plastic flow on an extrusion screw can be presented in simplified form as, $$Q = \alpha N - \frac{\beta \Delta P}{\mu}$$

where Q is the discharge flow rate, $\alpha$ and $\beta$ are specific collections of screw and barrel dimensions, $\Delta P$ is the pressure gradient across the screw, e.g., that which can be developed along the length of the screw, N is screw speed, and $\mu$ is the flow viscosity of the plastic. Both the general invention and the specific embodiments described above, minimize, but to different degrees, the sceond term of the equation, for the $\beta \Delta P/\mu$ of metering screw 10. In this way, variations in external conditions which have an effect on the $\Delta P$ and $\mu$ of the equation are greatly reduced in their effect on the flow rate, Q. Furthermore, the invention comprises a control system that can maintain the $\Delta P$ of the metering screw 10 at or in close proximity to zero. Thus, external variations which change the flow viscosity, $\mu$, have a negligible or non-existant effect on flow rate. Since the differential pressure is maintained constant, variations in flow resistance in the filter and die area have no effect on flow rate. If the pressure measured at element 14 changes, the pressure at element 8 will be similarly changed by control system 15.

A powdered poly(ethylene terephthalate) called PET polyester resin material was fed into the apparatus shown by FIGURE 1. The plasticating machine was operated at temperatures peaking at 560° F. in the middle of the cylinder and tapering off to 500° F. at the discharge end. The two transfer pipe lines were heated to 500° F. The metering machine was cooled to a cylinder temperature of 488° F. to maintain the plastic stream temperature at 502° F. The 2½ inch diameter screw of the plasticizing machine was operated at 33 r.p.m. varying 0.2 r.p.m. in response to the control signal from the pressure element between the two machines. This pressure was maintained constant at 515 p.s.i. The 2½ inch diameter metering extruder was operated at a locked-in screw speed of 38 r.p.m. The discharge pressure of the metering machine was 1000 p.s.i. increasing 100 p.s.i. throughout an 8 hour operation due to the gradual plugging of a filter. The discharge rate was continuously measured and found to be 39.6 pounds per hour with a maximum variation of approximately 0.2%. The variation of rate could not be measured more accurately. The maximum temperature variation of the discharge stream was 0.2° F. The transparent product was examined microscopically for evidence of incomplete melting. No unmelted or partially melted particles were found.

This illustrates a further refinement of the general invention as previously described: A powdered PET polyester resin was fed to the plasticating screw. See FIGURE 1. The plasticizing cylinder was operated at temperatures peaking at 555° F. and tapering off to 517° F. at the discharge end. The two pipe lines were heated to 520° F. The metering machine was cooled to a cylinder temperature of 508° F. to maintain the plastic stream temperature at 520° F. The plasticating machine was operating at 40 r.p.m. varying slightly in response to differential pressure signals. The metering extruder was operated at a locked-in screw speed of 33.9 r.p.m. The pressure differential between the two extruders varied from 620 to 660 p.s.i. during the 3 hour operation while the discharge pressure of the metering extruder varied similarly from 460 to 500 p.s.i. The difference between these pressures was maintained constant at 160 p.s.i. thorugh automatic control of plasticator screw speed. The dicharge rate was 55.6 pounds per hour with the maximum variation less than 0.2%, the limit of measuring accuracy. The maximum temperature variation of the discharge plastic stream was less than 0.2° F.

Although only one specific arrangement of equipment is shown and described, many other modifications and rearrangements may be made without departing from the spirit and scope of the underlying inventive concept. The machines can be located parallel to one another, or at any angle in a horizontal plane, or in variations of the vertical arrangement as shown. The screws employed in both machines can be single stage screws as illustrated. A two stage extraction type screw is hereinafter described for the plasticating machine.

It is manifest to those skilled in the art that one of the major machine components is the drive motor system 11 of the metering machine 2. The discharge flow rate is a direct function of this screw speed, hence, the basic drive motor speed regulation should be of the highest quality. A drive motor system with total random speed variations of less than 0.2% is most advantageous.

The conventional plasticating screw, illustrated on FIGURE 1, and more particularly the two stage extraction type described herein, cannot be operated above certain maximum pressures while at certain critical speed levels. There is a discharge pressure, directly related to screw speed, beyond which a plasticizing screw cannot effectively operate. In the case of two stage extraction screws operated at excessive pressure, the deep-flighted extraction section will fill with plastic and overflow through the extraction venting lines. The mathematical relationship between this flooding pressure and plasticizer screw speed should be determined and thence employed to limit operations. To satisfy this contingency, the pressure controls are normally provided such that any desired amount of signal from element 14 can be subtracted from the element 8 signal. The amount of element 14 signal can be varied with any suitable potentiometer or variable resistance device. At one extreme all of signal 14 is screened out and the plasticizing extruder operates to maintain constant pressure at element 8. At the opposite extreme, the full signal from element 14 is subtracted from the element 8 signal, and the plasticizing machine speed is varied to maintain constant pressure difference. The function of this potentiometer can be demonstrated algebraically as follows:

$$K = P_8 - XP_{14}$$

where K is the pressure control signal (set point) which is maintained by the plasticizing machine. $P_8$ is the signal from pressure measuring element 8, $P_{14}$ is the signal from pressure measuring element 14, X is a factor which varies the $P_{14}$ signal from 0 to 1.0.

Thus with X at 0, K, the set point will control to $P_8$ pressure. With X at 1.0, K will control to the true difference between $P_8$ and $P_{14}$.

This facility of the control circuit, or a similar facility wherein the "X" potentiometer is applied to the $P_8$ pressure can be usefully employed for extrusion of highly compressible plastics.

The use of the differential pressure control feature, effectively eliminates variable slippage of the plastic on screw 10. An increase in $P_{14}$ will be accompanied by an identical increase in $P_8$, maintaining the differential pressure constant. An increase in $P_{14}$ without a similar increase in $P_8$ would result in increased slippage on screw 10 and a reduction in flow rate. The differential pressure control, then, protects against variable slippage, but in some cases allows variable flow rate due to plastic compressibility. As the pressures on both ends, or the average pressure across screw 10 increases, the rate issuing from the screw will also increase. The higher pressures cause more plastic to be packed within the flights of screw 10, resulting in an increase in flow rate per revolution of the screw. This phenomenon can be corrected by values of X in the equation $$K = P_8 - XP_{14}$$

wherein X is less than 1.0, such as 0.8 or 0.9. The slight slippage which is thus allowed can be easily selected to exactly counteract the plastic compressibility. The discharge rate of screw 10 will then remain constant over wide ranges of pressure, $P_{14}$.

Controls for the dual machine system function by adjusting the speed of the plasticizing machine drive in a manner to obtain constant delivery from the metering machine.

In the basic system a pressure transmitter or transducer is installed in the transfer line between the plasticizing machine and the metering machine. The transmitter measures the pressure and transmits a proportional signal to the recording and controlling apparatus. This signal can be electrical, pneumatic or hydraulic depending upon the type of commercially available control equipment selected.

This transmitter signal is used in the recording apparatus to furnish a record of pressure in the transfer line. It is also connected to the controlling apparatus. In the recording and controlling apparatus there is included a means for setting the desired pressure, generally referred to as the control point or control setting. The controller compares the desired control setting with the actual pressure from the transmitter signal and by operating through the drive unit control causes the speed of the plasticating extruder to increase or decrease as required to bring the actual pressure to the desired magnitude.

These controllers are commercially available equipment of many different types and arrangements. The controllers operate in general by making calculations based on the deviation from the control setting and the rate of change in pressure. The controller output signal continually adjusts the drive speed on the basis of these calculations.

A second method of control extends the system to include components that will correct for slippage in the metering machine.

The delivery of the metering machine can be calculated from the volumetric displacement of the screw and its speed. Actually, however, the delivery is always less than this amount and this deficiency is termed the slippage. The magnitude of the slippage depends upon the pressure difference across the screw, being greater with larger differences in pressure.

The "slippage correction factor" can be introduced by additional control elements. The delivery pressure of the metering extruder will vary considerably with changes in elements downstream from the metering machine, but delivery would still be constant if the pressure difference is maintained at a constant value by manipulating the speed of the plasticizing machine.

The additional control components required for this arrangement consist of a second pressure transmitter located at the delivery end of the metering machine, a device for comparing the signals from the two pressure transmitters, and a second controller that will operate from the pressure difference to control the speed of the plasticizing machine. In this manner the controller makes corrections to the delivery pressure of the plasticizing machine to match those uncontrolled changes in pressure that occur at the delivery point of the metering machine.

There is a third control function provided that takes into consideration the compressibility that occurs on certain plastic materials as the pressure is increased. Inasmuch as this is proportional to the magnitude of pressure at the delivery point of the metering machine, the slight deficiency in delivered volume resulting from this pressure can be supplied by further changing of the speed of the plasticizing machine.

To accomplish this the signal from the pressure transmitter is introduced into a control device which increases its value. Specifically the signal is multiplied so that the amount of correction is proportional to the magnitude of the pressure.

Adjustment can be made in the size of the multiplier which makes it possible to match the correction to the compressibility characteristics of the specific plastic being extruded.

The increased signal is then connected to the device that is measuring pressure difference across the metering extruder and through its associated controller makes correction for the pressure difference as modified by the compressibility correction.

The control components themselves will be described briefly:

Pressure transmitters or transducers as they are sometimes called consist generally of a diaphragm which transmits the pressure of the liquid to the transducing device which may consist of a differential transformer or strain gauge in the case of electrical transmitters, or to a bellows or other force producing device in the case of pneumatic or hydraulic devices, although by no means are the methods limited to those mentioned. The transmitted signal may be A.C. or D.C., for example 0 to 0.5 volt A.C., 1 to 5 milliamps D.C., 4 to 20 milliamps D.C., minus 25 to plus 25 volts D.C., and numerous other ranges. Pneumatic transmitter ranges can be 3 to 15 p.s.i., 3 to 27 p.s.i., 0 to 100 p.s.i., etc. These are only a few of the ranges in general use today.

Recorders and indicators are of as many types as the transducer signals would indicate. Some are deflection type devices with galvanometer, bellows or Bourdon tube elements. Others are servo driven by electrical, magnetic or pneumatic means.

Controllers themselves are made to accept various transmitter signals. In general, the control setting is established by a signal similar to the transmitter signal although this is not universally true. The two signals are compared for difference and in the case of analog type equipment, the output signal represents the sum of three separate computations as follows:

The magnitude of the deviation multiplied by a constant, the rate of change of the measurement multiplied by a constant, and the product of deviation multiplied by time multiplied by a constant. These are the proportional, rate and automatic reset responses described in the literature of the manufacturer.

In this instance, the final control device is a motor driven unit.

Inasmuch as these units are customarily fitted with their own control systems for establishing constant speed within very narrow limits, it is only necessary to insert into the drive circuit itself a suitable signal for altering the speed.

The controller output signal itself can be modified to accomplish this purpose through the addition of suitable electrical components or in the case of pneumatic or hydraulic transmission through the addition of a transducer to convert it to the desired electrical signal.

As has become apparent from the description herein, this invention in its more generalized aspects provides apparatus for continuously forming and advancing at a constant rate a stream of softened plastic material adapted to be formed into an elongated shape having uniform dimensions comprising (1) a plasticating machine for continuously receiving, softening and advancing a stream of softened plastic material through an outlet at a variable rate, (2) a metering machine for continuously advancing said stream of softened plastic material under pressure, said metering machine having (a) a cylinder having an inlet for said plastic material, (b) a screw in said cylinder having a metering section, (c) a variable rate of energy for the drive apparatus connected to said screw, and (d) an outlet at the end of said metering section, (3) a pre-metering transfer means adapted to transfer softened plastic material being discharged from the plasticating machine to the metering machine and having associated therewith, means for originating a pre-metering pressure indicative signal, (4) a post-metering transfer means adapted to transfer from said metering machine softened plastic material to means adapted to form said material into an elongated shape and having associated with said transfer means, means for originating a post-metering pressure indicative signal, (5) control means adapted to receive said pressure indicative signals and responsively regulate said variable rate of said plasticating machine and said rate of energy for the drive apparatus connected to the metering screw whereby the rate at which said softened plastic material advances through said post-metering transfer means is substantially constant.

The plasticating machine can obviously be a gear pump or any other equivalent apparatus.

It is also apparent that a more particular aspect of this invention provides apparatus for continuously forming an elongated shape from a plastic material comprising (1) a plasticating machine for continuously softening and advancing a stream of softened plastic material under pressure, said plasticating machine having (a) heat-regulated cylinder having an inlet for said plastic material, (b) a screw in said cylinder having a feed section and a compression section, (c) a variable speed drive apparatus connected to said screw, and (d) an outlet at the end of said screw, (2) a metering machine for continuously advancing said stream of softened plastic material under pressure, said metering machine having (a) a cylinder having an inlet for said plastic material, (b) a screw in said cylinder having an introductory section and a metering section, (c) a drive apparatus connected to said screw to provide a predeterminable rate at which said plastic advances, (d) an outlet at the end of said metering section, and (e) heat regulated means in contact with said cylinder, (3) means for the final processing of said plastic material into an elongated shape having uniform dimensions, (4) a pre-metering transfer means adapted to transfer softened plastic from the outlet of said plasticating machine to the inlet of said metering machine and having a pre-metering pressure measuring device, said transfer means being adapted to (A) measure $P_8$ which is the pressure of plastic material in said transfer means and (B) transmit a pre-metering pressure indicative signal corresponding to $P_8$, (5) a post-metering transfer means adapted to transfer softened plastic from the outlet of said metering machine to said means for final processing, said transfer means being adapted to (A) measure $P_{14}$ which is the pressure of plastic material in said transfer means and (B) transmit a post-metering pressure indicative signal corresponding to $P_{14}$, (6) control means adapted to receive said pressure indicative signals and responsively regulate said variable speed drive apparatus whereby (a) $P_8$ and $\Delta P$ have values adapted to maintain said metering apparatus completely filled with plastic material, said $\Delta P$ being $P_8-P_{14}$, and (b) $P_8$ and $\Delta P$ are capable of being interrelated with said variable speed drive apparatuses whereby Q which is said predeterminable rate at which said plastic material advances through said post-metering transfer means is capable of being maintained constant within a variation of less than 0.5%.

This more particular embodiment of this invention comprises apparatus as just defined wherein the variable speed drive apparatus for the metering machine is capable of being held at a constant speed whereby Q is held constant by having said control means adapted to regulate said variable speed drive apparatus for the plasticating machine in response to the $P_8$ pressure indicative signal.

Quite advantageously, said control means is adapted to hold constant the value of $P_8-P_{14}$ which is $\Delta P$ for the metering machine.

Quite advantageously, said control means is adapted to hold $\Delta P$ at approximately zero. Quite unexpectedly it is especially advantageous that $\Delta P$ be between minus 100 and minus 500 p.s.i.

Quite advantageously, said control means is adapted to hold Q constant with respect to plastic materials wherein Q is a function of $\Delta P$ divided by $\mu$, where $\mu$ is subject to variation in the properties of the plastic material, $\mu$ being the flow viscosity thereof.

It is also especially advantageous where said control means is adapted to regulate said variable speed drive apparatus for the plasticating machine by holding at a constant value $P_8-XP_{14}$ wherein X is a value from 0 to 2 adapted to exactly counteract the effect of variations in Q.

The value of X is ordinarily either 0 or from 0.8 to 1.2. In the latter case the value is generally between 0.8 and 1.0.

A further advantageous refinement of the apparatus is provided where said control means is adapted to regulate said variable speed drive apparatus for the plasticizing machine by holding at a constant value $X_1P_8-X_2P_{14}$ wherein $X_1$ and $X_2$ are values adapted to exactly counteract the effect of variations in Q.

The values of $X_1$ and $X_2$ can be selected so as to compensate for variations in process variables such as compressibility, non-Newtonian properties, etc. These process variables are affected by the conditions existing as to the apparatus, the composition of the plastic material, etc. For example, flow viscosity may increase or decrease with increasing shear stress. The plastic composition may include some dissolved or entrapped vapors or gases. The values of $X_1$ and $X_2$ may be determined as functions of $P_8$, $P_{14}$ and/or other process variables such as temperature. In the most simple cases $X_1$ and $X_2$ are selected abitrarily as a result of test runs and left at their optimum values for a certain set of process variables. However, it is most advantageous to determine a mathematical relationship between $X_1$ and $X_2$ and process variables such as $P_8$ and $P_{14}$ whereby the control system can be adapted to vary $X_1$ and $X_2$ to maintain optimum values despite changes in process variables.

The purpose of the pre-metering transfer line is to separate the plasticating machine from the metering machine and it provides a convenient place to measure $P_8$. As mentioned above, $P_8$ might also be measured in the introductory section of the metering machine screw at any point up to where the metering section of this screw begins. However, there need not necessarily be any introductory or feed section for this screw since it could have a metering configuration in its entirety. The pre-metering transfer line is advantageously as short as possible. When a sample of linear highly polymeric polyester softened plastic material is removed at this point and evaluated by being quenched in water it is sometimes found that the softened or melted material does contain a minor proportion of incompletely melted polyester, but when this minor amount is sufficiently small the polyester plastic material nevertheless behaves as a completely homogeneous melt. Of course, it is most advantageous that there be no unmelted material. In no event is there ever any unmelted material in the post-metering transfer means.

The elongated shapes formed by the process and apparatus described herein include film, rods, tubes and other shapes having various cross-sectional shapes.

The individual elements of the apparatus provided by this invention are well known in the art related to the production of elongated shapes by extrusion or the like. Hence, no purpose would be served by a more elaborate description of such elements. Thus, for example, in the drawing, the feed zone A is well known to advantageously avoid use of any considerable taper in the screw. Similarly, compression zone B is well known to be characterized by a moderate taper and metering zones such as C and E have substantially no taper to the screw. Metering zone C can be dispensed with entirely, although its presence is generally advantageous; if C is absent, the compression zone leads directly into the transfer means. The connections 6', 8' and 14' shown in the drawing schematically represent conventional elements of standard electrical, pneumatic or other types of controls. Similar remarks could be applied to the other elements. The invention resides in a new and unobvious combination thereof and process employed therein, or an equivalent process.

The plastic materials which can be employed include cellulose acetate, cellulose acetate-butyrate, nylon 66, ployethylene, polystyrene, polypropylene, 6-nylon, poly-(1,4-cyclohexanedimethylene terephthalate), and any other highly polymeric organic plastic materials as well as other plastic materials. However, it is primarily useful with respect to organic thermoplastic materials.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. Apparatus for continuously receiving plastic material, advancing a softened stream of said plastic material at a constant rate in a manner adapted to be formed into an elongated shape having uniform dimensions comprising (1) a first pumping device for continuously receiving plastic material and advancing a softened stream of said plastic material under pressure, said first pumping device being capable of operating at a variable speed, (2) a transfer means adapted to transfer under pressure, softened plastic material being discharged from the first pumping device to a second pumping device and having associated therewith means for originating a between-pumps pressure indicative signal, (3) a second pumping device for continuously receiving and advancing said stream of softened plastic material under pressure, said second pumping device being capable of operating at a constant pre-selected speed, (4) a transfer means adapted to transfer under pressure said softened plastic material being discharged from the second pumping device to means adapted to form said material into an elongated shape having uniform dimensions, and having associated therewith means for originating a post-second pumping device pressure indicative signal, and (5) control means adapted to receive said pressure indicative signals and responsively regulate said variable speed of said first pumping device to maintain constant the arithmetic sum of a function of the between-pumps pressure and a function of the post-second pump pressure whereby the rate at which said softened plastic material advances through the means adapted to form said elongated shape with uniform dimensions is substantially constant.

2. Apparatus as defined in claim 1, wherein said first pumping device is a plasticating extruder comprising (1) a heat regulated cylinder having an inlet for said plastic material, (2) a screw for advancing said plastic material in said cylinder, (3) a variable speed drive apparatus connected to said screw, and (4) an outlet at the end of said screw for discharging a softened stream of said plastic material under pressure.

3. Apparatus as defined in claim 1, wherein said first pumping device is a melt extruder comprising (1) a heat regulated cylinder having an inlet for said softened and melted plastic material, (2) a screw for advancing said plastic material in said cylinder, (3) a variable speed drive apparatus connected to said screw, and (4) an outlet at the end of said screw for discharging said softened and melted plastic material under pressure.

4. Apparatus as defined in claim 1, wherein said first pumping device is a gear pump comprising (1) a heat regulated gear pump having an inlet for said softened and melted plastic material, (2) a variable speed drive apparatus connected to said gear pump, and (3) an outlet for discharging said softened and melted plastic material under pressure.

5. Apparatus as defined in claim 2, wherein said first pumping device is a two-stage screw provided with means to extract and remove entrained gases and volatile constituents from the softened stream of plastic material before said first pumping device discharges said softened plastic material under pressure.

6. Apparatus as defined in claim 3, wherein said first pumping device is a two-stage screw provided with means to extract and remove entrained gases and volatile constituents from the softened stream of plastic material before said first pumping device discharges said softened plastic material under pressure.

7. Apparatus as defined in claim 1 wherein said second pumping device is a metering-type extruder comprising (1) a heat regulated cylinder having an inlet for the softened plastic material, (2) a screw in said cylinder having a metering section, (3) a drive apparatus connected to said screw capable of operating at a constant pre-selected speed, and (4) an outlet at the end of said screw for discharging softened plastic material under pressure.

8. Apparatus for continuously forming and advancing at a constant rate a stream of softened plastic material adapted to be formed into an elongated shape having uniform dimensions comprising (1) a plasticating machine for continuously receiving, softening and advancing a stream of softened plastic material under pressure, and continuously discharging said plastic material through an outlet at a variable rate, (2) a metering machine for continuously advancing said stream of softened plastic material under pressure, said metering machine having (a) a cylinder having an inlet for said plastic material, (b) a screw in said cylinder having a metering section, (c) a variable rate of energy for the drive apparatus connected to said screw, and (d) an outlet at the end of said metering section, (3) a pre-metering transfer means adapted to transfer softened plastic material being discharged from the plasticating machine to the metering machine and having associated therewith means for originating a pre-metering pressure indicative signal, (4) a post-metering transfer means adapted to transfer from said metering machine softened plastic material to means adapted to form said material into an elongated shape and having associated with said transfer means, means for originating a post-metering pressure indicative signal, (5) control means adapted to receive said pressure indicative signals and responsively regulate said variable rate of said plasticating machine and said rate of energy for the drive apparatus connected to the metering screw whereby the rate at which said softened plastic material advances through said post-metering transfer means is substantially constant.

9. Apparatus as defined by claim 8 wherein the pasticating machine includes means to extract volatile constituents from the stream of plastic material therein.

10. Apparatus for continuously forming an elongated shape from a plastic material comprising (1) a plasticating machine for continuously softening and advancing a stream of softened plastic material under pressure, said plasticating machine having (a) a heat-regulated cylinder having an inlet for said plastic material, (b) a screw in said cylinder having a feed section and a compression section, (c) a variable speed drive apparatus connected to said screw, and (d) an outlet at the end of said screw, (2) a metering machine for continuously advancing said stream of softened plastic material under pressure, said metering machine having (a) a cylinder having an inlet for said plastic material, (b) a screw in said cylinder having an introductory section and a metering section, (c) a drive apparatus connected to said screw to provide a predeterminable rate at which said plastic material advances, (d) an outlet at the end of said metering section, and (e) heat regulated means in contact with said cylinder, (3) means for the final processing of said plastic material into an elongated shape having uniform dimensions, (4) a pre-metering transfer means adapted to transfer softened plastic from the outlet of said plasticating machine to the inlet of said metering machine and having a pre-metering pressure measuring device, said transfer means being adapted to (A) measure $P_8$ which is the pressure of plastic material in said transfer means and (B) transmit a premetering pressure indicative signal corresponding to $P_8$, (5) a post-metering transfer means adapted to transfer softened plastic from the outlet of said metering machine to said means for final processing, said transfer means being adapted to (A) measure $P_{14}$ which is the pressure of plastic material in said transfer means and (B) transmit a post-metering pressure indicative signal corresponding to $P_{14}$, (6) control means adapted to receive said pressure indicative signals and responsively regulate said variable speed drive apparatus whereby (a) $P_8$ and $\Delta P$ have values adapted to maintain said metering apparatus completely filled with plastic material, said $\Delta P$ being $P_8 - P_{14}$, and (b) $P_8$ and $\Delta P$ are capable of being inter-related with said variable speed drive apparatus whereby Q which is said predeterminable rate at which said plastic material advances through said post-metering transfer means is capable of being maintained constant within a variation of less than 0.5%.

11. A process for continuously advancing a softened stream of plastic material at a constant rate in a manner adapted to be formed into an elongated shape having uniform dimensions comprising (1) continuously receiving under pressure a softened plastic material into a pumping device, said pumping device being capable of operating at a constant preselected speed, (2) advancing said softened plastic material through said pumping device under regulated heat and pressure, (3) discharging said softened plastic material under pressure to means adapted to form said material into an elongated shape having uniform dimensions, (4) originating a pre-pumping device pressure indicative signal and a post-pumping device pressure indicative signal, (5) forceably regulating said pre-pumping device pressure by external means to maintain constant the arithmetic sum of a function of the pre-pumping device pressure and a function of the post pumping device pressure whereby the rate at which said softened plastic material advances through the means adapted to form said elongated shape with uniform dimensions is substantially constant.

12. A process for continuously advancing at a constant rate a stream of homogeneous completely softened plastic material adapted to be formed by shaping means into an elongated shape having uniform dimensions comprising (1) plasticating said plastic material under regulated heat and pressure whereby it is formed into a homogeneous and completely softened stream flowing at a variable rate, (2) transferring said stream of plastic material under pressure to a metering machine which comprises a heat-regulated cylinder containing a metering screw driven at a predetermined rate, (3) measuring the pre-metering pressure of said stream while being transferred to said metering machine, (4) transferring said stream to shaping means, (5) measuring the post-metering pressure of said stream while being transferred to said shaping means, and (6) regulating the pre-metering pressure and the differential pressure in relationship to said plasticating flow rate and said metering screw rate, whereby said stream being transferred to said shaping means flows at a constant rate, said differential pressure being said pre-metering pressure minus said post-metering pressure.

13. A process for continuously receiving plastic material, advancing a softened stream of said plastic material at a constant rate in a manner adapted to be formed into an elongated shape having uniform dimensions comprising (1) continuously receiving plastic material and advancing a softened stream of said plastic material under pressure and regulated heat in a first pumping device, said first pumping device being capable of advancing said softened plastic material at a variable rate, (2) transferring said softened plastic material under pressure from the discharge of said first pumping device to a second pumping device, (3) originating a between-pumps plastic pressure indicative signal, (4) receiving and advancing said softened plastic material under pressure and regulated heat in a second pumping device, said second pumping device being capable of operating at a constant preselected speed, (5) transferring said softened plastic material under pressure from the discharge of said second pumping device to means adapted to form said material into an elongated shape having uniform dimensions, (6) originating a post-second pumping device plastic pressure indicative signal, (7) receiving said plastic pressure indicative signals in a suitably adapted control means, and (8) responsively regulating said variable rate of discharge of said softened plastic material from said first pumping device by said control means to maintain constant the arithmetic sum of a function of the between-pumps pressure and a function of the post-second pump pressure whereby the rate at which said softened plastic material advances through the means adapted to form said elongated shape with uniform dimensions is substantially constant.

References Cited in the file of this patent
UNITED STATES PATENTS

| | | |
|---|---|---|
| 2,369,553 | Fields | Feb. 13, 1945 |
| 2,747,224 | Koch et al. | May 29, 1956 |
| 2,836,851 | Holt | June 3, 1958 |